United States Patent
Brandes

[11] Patent Number: 5,817,926
[45] Date of Patent: Oct. 6, 1998

[54] PROCESS AND DEVICE FOR MONITORING THE TIGHTNESS OF PIPELINES, IN PARTICULAR SEWAGE PIPELINE SYSTEMS

[76] Inventor: Bernd Brandes, Muehlengrund 4, Grebin d-24329, Germany

[21] Appl. No.: 793,522

[22] PCT Filed: Aug. 16, 1995

[86] PCT No.: PCT/EP95/03238

§ 371 Date: Feb. 27, 1997

§ 102(e) Date: Feb. 27, 1997

[87] PCT Pub. No.: WO96/07089

PCT Pub. Date: Mar. 7, 1996

[30] Foreign Application Priority Data

Aug. 27, 1994 [DE] Germany .......................... 44 31 367.5

[51] Int. Cl.[6] ........................................ G01M 3/08
[52] U.S. Cl. ............................ 73/40.5 QR; 73/49.1
[58] Field of Search ................ 73/49.1, 40.5 R; 405/157–158; 138/97

[56] References Cited

U.S. PATENT DOCUMENTS

| | | | |
|---|---|---|---|
| 3,184,958 | 5/1965 | Eaton | 73/40.5 R |
| 3,191,427 | 6/1965 | Rapson | 73/40.5 R |
| 3,561,492 | 2/1971 | Kauder | 138/121 |
| 3,831,636 | 8/1974 | Bittner | 138/173 |
| 4,763,511 | 8/1988 | Mathison et al. | 73/49.1 |
| 4,838,079 | 6/1989 | Harris | 73/155 |
| 5,072,622 | 12/1991 | Roach et al. | 73/40.5 R |
| 5,172,730 | 12/1992 | Driver | 138/104 |
| 5,546,992 | 8/1996 | Chick et al. | 73/49.1 |

*Primary Examiner*—Hezron E. Williams
*Assistant Examiner*—Jay L. Politzer
*Attorney, Agent, or Firm*—Salter & Michaelson

[57] ABSTRACT

In a process for monitoring the tightness of pipelines, in particular sewage pipeline systems, one or several control channels or tubular openings are arranged in the wall of the pipeline in its longitudinal direction. The mutually facing ends of the pipelines are interconnected so that the mutually facing ends of the control channels or tubular openings are tightly interconnected. The interconnected control channels or tubular openings form a closed pressure chamber for the whole pipeline system. The control channels or tubular openings are filled with a test medium under static pressure, pressure measurement means are associated with the control channels or tubular openings, and a leakage in the area of a sleeve or wall of the pipeline is detected when the pressure of test medium falls between two measuring points.

10 Claims, 3 Drawing Sheets

PROCESS AND DEVICE FOR MONITORING THE TIGHTNESS OF PIPELINES, IN PARTICULAR SEWAGE PIPELINE SYSTEMS

BACKGROUND AND SUMMARY OF THE INVENTION

The invention relates to a method for monitoring the tightness of pipelines, in particular sewer line systems, and a device for carrying out the method.

Stoneware for drainage purposes is standardized in DIN 1230, for example in the publication of the edition of January 1986. Sewer pipeline systems are nowadays increasingly being laid inside water protection areas. This process requires particular care that no sewage emerges from the pipes and shafts and pollutes the groundwater and makes it unusable. The damage to the environment can be considerable in this case. It is known ("Steinzeugrohre in Trinkwasserschutzgebieten" [Stoneware pipes in drinking water protection areas] in Straben- und Tiefbau 2/90) to demand permanent and monitored tightness of such pipelines. It is also known from these literature sources to make use, for the purpose of meeting such demands, of single walled pipes which satisfy the requirements of the pressure pipe range. This means that the pipe is subjected to a test pressure of 2.4 bar and an operating pressure of 1.6 bar. The carrying capacity of the pipe is likewise designed to be higher than actually required. Consequently, particularly thick pipes are used. Before commissioning, during operation, before expiry of the warranty and every five years after, the pipes provided for use in drinking water protection areas are to be tested for their tightness. The testing is performed optically, for example after excavating the earth in a prescribed section. In the case of a leak in a pipeline, the defective point is likewise determined by excavation of the earth along the line. It is known, furthermore, to use double-walled pipes, in order for it to be able to catch leaks arising in the inner pipe by the pipe arranged around the latter.

It is mostly pipes made from stoneware which are used, since these deliver particularly good results even in the case of short-term or long-term, sometimes extreme chemical, physical, frequently thermal, or biological loads. Stoneware is flexurally stiff, dimensionally stable and resistant to corrosion, and, apart from hydrofluoric acid, is not attacked by any substance contained in the sewage, groundwater or earth.

In addition, concrete, which has somewhat different performance characteristics, is frequently used as the material. Even today, shafts are still, in part, built in brick or stone and/or produced from concrete.

Only the generally valid term of "pipeline" is to be used below.

It is the object of the invention to provide an improved method for monitoring the tightness of pipelines, in particular sewer line systems, and a device for carrying out the method.

This object is achieved by means of the invention described herein. The result is to permit continuous monitoring, at any time, of the tightness of the pipelines, without having to undertake excavations of the earth. It is also possible to use single-walled pipes which do not satisfy the requirements of the pressure tube range. The data of the individual measuring and monitoring stations, which are arranged distributed over the pipeline system, can be interrogated in one monitoring station.

In principle, a method for monitoring the tightness of pipelines, in particular sewer line systems, is provided, in which one or more monitoring channels or tubular openings are arranged in the wall of the pipeline along its longitudinal extent. The mutually facing ends of neighbouring pipelines are joined to one another such that the mutually facing ends of the monitoring channels or tubular openings are tightly joined. The mutually joined monitoring channels or tubular openings joined to one another form, for the entire pipeline system, a closed pressure chamber which also includes the sealing regions. The monitoring channels or tubular openings are filled with a test medium under static pressure. This can be a gas, on the one hand, or a liquid, on the other hand. The monitoring channels or tubular openings are assigned means for measuring the pressure. Finally, a leak in the region of a sleeve or of the wall of the pipeline is determined by a drop in the pressure of the test medium between two measuring points. Even the removal of a defect can be performed, without excavating the earth, by means of a filler material which is introduced, with the test medium, into the continuous monitoring channels. At the leakage point, said filler material combines with the emerging substance, for example sewage, to form a cementing layer which is deposited at the leakage point.

The pipelines are produced with one wall and from stoneware, concrete or any other materials. It is also possible to use double-walled pipelines. However, these are much more expensive and scarcely offer any advantages in the case of this method. The monitoring channels mostly have a diameter of less than 10 mm, in particular 3 mm. They are either manufactured from glass and inserted into the wall of the pipeline in the longitudinal direction thereof during the operation (casting) to manufacture the pipelines, or they are produced from a flexible material as hose-like tubelets and can be removed again from the wall of the pipeline after the latter has dried. However, they can also be provided, during the casting operation, by a solid core, for example made of metal with a Teflon coating. The said core is subsequently drawn out of the pipe wall again, in accordance with the principle of an internal broach, by being vibrated and/or being rotated. The wall of the monitoring channel is additionally compacted in the process. The latter two methods are suggested in the case of pipelines made of concrete. Instead of the monitoring channels, tubular openings then remain in the wall of the pipeline. One or more, for example four, such monitoring channels or tubular openings are arranged distributed over the cross-section of the pipeline. However, monitoring channels of larger diameter can also be used. For example, a double-walled pipeline can be produced such that webs or the like are inserted between the outer wall and the inner wall. This then produces, in the cross-sectional view of the pipeline, chambers which are arranged uniformly distributed and serve as monitoring channels.

Just like the individual pipelines, the monitoring channels are joined at their ends to further monitoring channels of the following pipeline. They form a closed chamber as a result. At a starting point, a test medium, which is a gas or a liquid, under static pressure is admitted to this chamber of the monitoring channels by a pump or a compressor. As a result, the monitoring channel chamber produced is continuously at a predetermined overpressure with respect to the surroundings and is therefore denoted below as a pressure chamber. The test medium can be compressed air, a gas, water or a liquid with special properties. With sewage, it can form a mass which recloses or cements a leakage point, or which in any case does not react chemically and/or explosively therewith.

Before the gas passes from the pump into the monitoring channels, it is led via a measuring section. This is a first nozzle. The pressure upstream of the nozzle and that downstream of the nozzle are determined. Ideally, the pressure downstream of the nozzle does not vary in the absence of a leak in the pipeline system, but it does vary slightly in reality. A second nozzle can be connected in parallel with the first, for the purpose of extending the measuring range.

Various measuring points are provided along the pipeline system. At these points, means for measuring pressure, for example pressure gauges or pressure sensors, record the respective pressure prevailing in the monitoring channels. If the pressure varies between two measuring points more strongly than is permissible in a real system, a leakage point must have occurred between the two measuring points. Coarse localization permits this to be said. Fine localization yields the precise location of the leakage point from a calculation which takes account of the pressure drop over the length of the pipeline.

BRIEF DESCRIPTION OF THE DRAWINGS

For the purpose of a more detailed explanation of the invention, a number of exemplary embodiments of devices for monitoring the tightness of pipelines, in particular sewer line systems, are described below with the aid of the drawings, in which.

DETAILED DESCRIPTION OF THE PREFERRED EMBODIMENTS

Figure 1:
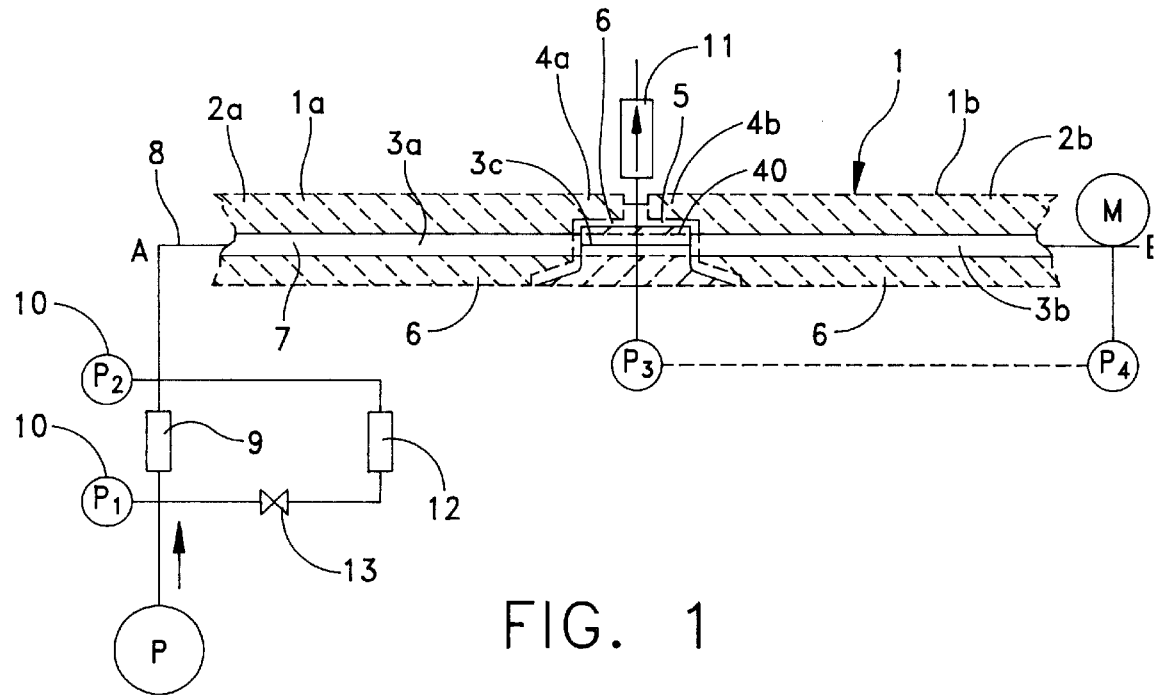
FIG. 1 shows a diagrammatic schematic sketch of a first embodiment of a device for monitoring the tightness of pipeline systems.

A first embodiment of a device for monitoring the tightness of pipelines $1a$, $1b$ is shown in a schematic sketch in FIG. 1. The pipelines $1a$, $1b$, indicated by dashes, are represented by a half section of their outer walls $2a$, $2b$. Arranged inside these outer walls $2a$, $2b$ are one or more monitoring channels 3. The latter are provided distributed over the cross-section of the pipelines $1a$, $1b$. One monitoring channel 3 for each pipeline is represented in FIG. 1. The two pipelines $1a$, $1b$ are shown in the region of an annular sleeve joint 40. The sleeve joint 40 joins the pipelines $1a$ and $1b$ and the monitoring channels $3a$ and $3b$. The monitoring channel $3c$ is provided inside the sleeve joint 40. The monitoring channels $3a$, $3b$ and $3c$ are arranged at the same level. Provided between the sleeve joint 40 and the two walls $2a$, $2b$ of the pipelines $1a$, $1b$, inside a gap 5 produced there when the parts are joined together, is a seal 6, for example gaskets or a packing with foamed materials or the like.

The monitoring channels 3 are filled from the end of the monitoring channel $3a$ with a test medium 7, which is at a prescribable pressure and is represented here by dots. So that the test medium 7 can be filled into a closed chamber, the monitoring channels 3 are closed at the end of the pipelines 1, here the line $1b$, or provided with a defined small passage in order to obtain a monitored flow measurement. The start of the monitoring channels 3, here the monitoring channel $3a$, is joined to a feed line 8. The test medium 7 is introduced in compressed form into the monitoring channels 3, or the chamber formed by the closed monitoring channels 3, by means of a pump P, or a compressor, joined to the monitoring channels 3 by the feed line 8. The chamber is denoted below as a pressure chamber. The static pressure which is produced by the pump P for the test medium is comparatively low. It is 1 to 2 bar, for example. The pump can therefore have a compact design and be dimensioned for low power. The pressure of the test medium 7 in the monitoring channels 3 is higher than the pressure of the sewage in the interior 16 of the pipeline 1. This prevents sewage from being able to pass into the monitoring channels in the event of a leak and blocking them. Use is made, as test medium 7, of compressed air or another gas or liquid medium which forms a sealing mass with any sewage which may emerge, and immediately re-cements the leak of its own accord.

A measuring section 9, here a first nozzle, is arranged in the fed line 8 between the pump P and monitoring channels $3a$. Said measuring section produces a desired, predetermined drop in the test medium pressure. The drop in pressure can be measured. For this purpose, means 10 for measuring the pressure, for example pressure gauges or pressure sensors, are provided upstream and downstream of the nozzle 9. The pressure sensor $P_1$ determines the pressure upstream of the nozzle or measuring section 9, and the pressure sensor $P_2$ does the same downstream. The pressure set up downstream of the nozzle 9 is the starting value A. The test medium is fed into the pressure chamber of the monitoring channels 3 at this pressure. In order to extend the measuring range, a second nozzle 12 can be connected in parallel with the first nozzle 9. A valve 13 is connected in the feed path of the second nozzle 12. The second nozzle 12 can be activated optionally as a result.

A further means 10 for measuring pressure, a pressure sensor $P_4$, is arranged at the end of the pipeline $2b$. It is provided at a measuring point M, for example. It determines the final value E of the pressure there.

The mode of operation of the device is to be described in more detail below with the aid of FIG. 2.

Figure 2:
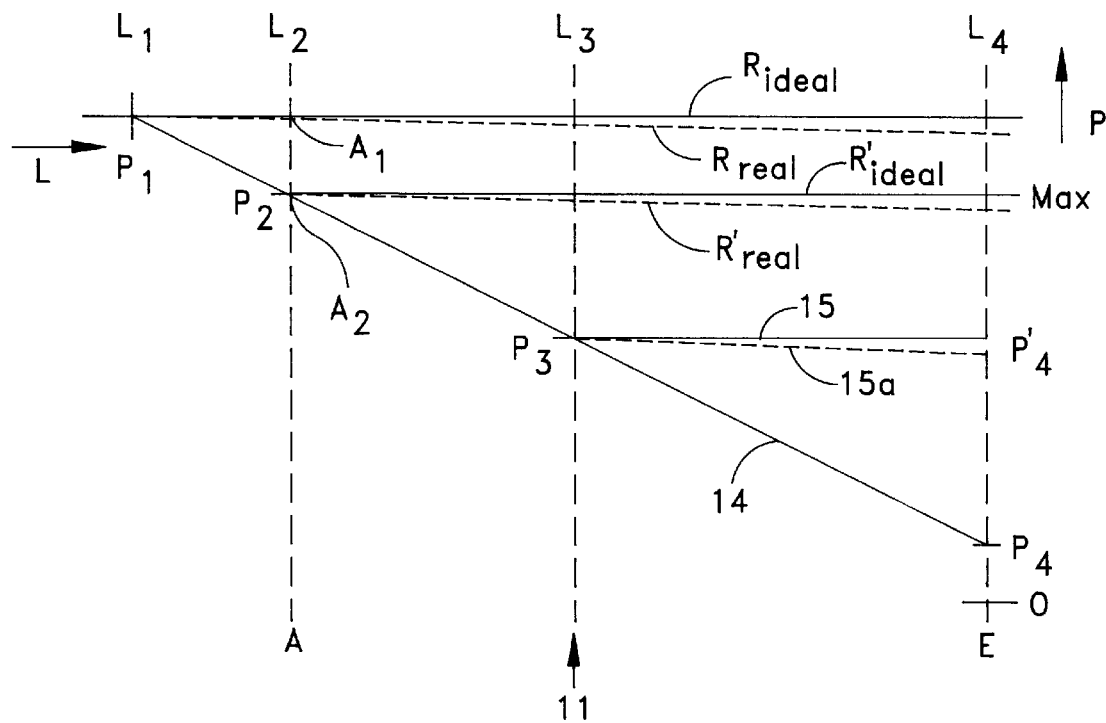
FIG. 2 shows a pressure characteristic diagram plotting the pressure against the length of the pipeline system, including feed line.

FIG. 2 shows a pressure characteristic diagram in which the pressure p is plotted against the length l of the pipelines $1a$, $1b$, the feed line 8 and the measuring section 9. One curve is shown for a starting value A1 of the test medium pressure where the nozzle 9 is in operation, while a further curve is shown for a starting value A2 of the test medium pressure where the nozzle 12 is in operation. The pressure drop over the entire length of the pressure chamber of the monitoring channels $3a$ and $3b$ and the feed line 8 is plotted over the entire summed length.

The test medium in the monitoring channels 3 is at a constant pressure. In the state of rest, the pressure is essentially the same at all points of the pipelines $1a$, $1b$. The uppermost horizontal line thus indicates the state of rest $R_{ideal}$ of the entire pressure chamber. The static pressure of the test medium 7 in the monitoring channels 3 is fully constant in this case and corresponds to the pressure of the pump P in the case of an ideally tight pipeline 1 and ideally tight path from the pump P to the measuring point $1_4$. This pressure is denoted as the maximum. The dashed line therebelow indicates the real state of rest $R_{real}$. In this case, account is taken over the pipelines of the losses, along the path from the pump to the measuring point $1_4$, which occur even without a leakage point 11. The pressure in the monitoring channels 3 also then drops slightly over their length and is no longer constant.

Because of an extraction of test medium volume, the pressure varies from the value $P_1$ to the value $P_2$ along the measuring section or the nozzle 9. The pressure drop is smaller or larger depending on the nozzle 9 and/or 12 connected in. The pressure then prevailing at the point $1_2$ is the already mentioned starting value A1 or A2 at the start of the monitoring channel 3a. The further course of the curve in the tight state for the starting value A1 is the said characteristic $R_{ideal}$, while, in the real state, little affected by losses, it is the characteristic $R_{real}$. At a starting value $A_2$, characteristics $R'_{ideal}$ and $R'_{real}$ are set up parallel to the characteristics $R_{ideal}$ and $R_{real}$. A pressure drop $R_{real}$ or $R'_{real}$ is also set up when, for test purposes, the pressure chamber of the monitoring channels 3 is not closed at the end E, but rather is provided with a defined opening for producing a small minimum flow. Permanent monitoring of the flow through the defined opening is then provided.

If a leakage point 11 occurs in the course of the pipelines 1a, 1b or of the sleeve 4, the test medium escapes there. The leakage point 11 is indicated in FIG. 1 in the region of the sleeve 4. The reason for this could be leaks in the seal 6. Were the reason for this that the outer wall 2a, 2b of the pipelines 1a, 1b is broken or damaged, the monitoring channels 3a, 3b or tubular openings arranged in the wall break together with the pipelines 1a, 1b. There is thus a pressure drop at the leakage point, since the test medium is escaping. However, it is not readily possible to determine directly the value of said pressure drop, since the precise leakage point is initially not known. The pressure sensor $P_3$ is therefore represented by chain-dotted lines. It is only imaginary. It is at first possible to come to only a rough conclusion on the leakage point 11. Fine localization requires a further measurement or calculation. In this way, a leakage point 11 can thus be determined without digging up the pipelines 2 or acoustically monitoring hissing noises occurring in the region of their joining sleeves 4.

If, a the point $1_4$, the final value E of the pressure $P_4$ along the section under consideration is determined as a value which is smaller than the pressure $P_2$, it can be deduced from this that a leak 11 has occurred between the point $1_2$ and the point $1_4$. The two values $P_2$ and $P_4$ are connected to one another in the diagram in FIG. 2 by a straight line 14. The slope of the curve is a measure of the internal resistance of the pipelines from the starting value A2. The coarse localization thus states that the pressure of the leakage point is to be placed on the straight line 14 between the point $1_3$ and the point $1_4$. If the leak happens to be precisely at the point $1_4$, fine localization is very easy. At this point $1_4$, the pressure is then at a minimum and essentially maintains this value at the next measuring point.

For the case in which the leak 11 is positioned not precisely in the region of the measuring point, the point $1_4$, but between the point $1_2$ and the point $1_4$, fine localization must be performed differently. The test medium volume which is statically present in the monitoring channels 3 can be calculated on the basis of the power of the pump and of the volume of the monitoring channels 3, that is to say of the pressure chamber which is available. In the case of a leak 11, the gas volume flows from said pressure chamber as a volumetric flow. Assuming a sufficiently large leak 11, the volumetric flow flowing from the leak is limited by the maximum pump power and the section 9, acting as the internal resistance of the test medium source. The pressure $P_4'$, for example, is measured at the measuring point $1_4$. The resistance of the monitoring channels is relatively high and can be determined. It is also possible to determine the volumetric flow set up. The resistance of the leakage point, by contrast, is very low. The point on the pipeline at which the leakage has occurred can be determined from the pressure drop, which can be determined by pressure sensors at the measuring points, in conjunction with the resistance of the monitoring channels and the volumetric flow. Specifically, the pressure is proportional to the product calculated from the volume of the test medium in the pressure chamber of the monitoring channels and of the feed line and from the frictional resistance of the section of the monitoring channels and feed line. According to the law of Hagen-Poiseuille, the quantity Q flowing or the strength of the volumetric flow is proportional to the product calculated from the radius R or the area of the monitoring channels 3 to the fourth power and from the difference of two pressures, here $P_2 – P_4'$, and inversely proportional to the product calculated from the length $l_2$ up to the leak and from a frictional constant. The frictional resistances of the entire section made up of the monitoring channels 3 and feed line 8 can be determined in a preliminary test, and the frictional constant can be calculated therefrom. The length $l_3$ is then yielded by rearranging the formula:

$$Q = \{[\pi/(8n)][\alpha_1 - \alpha_2)/l_3]R^3\}$$

$$l_3 = \{[\pi/(8n)][(\alpha_1 - \alpha_2)/Q]R^4\}$$

where $\alpha_1 := P_1$ $\alpha_2 := P_4'$

The quantity Q is yielded from the measurements relating to the measuring section 9. The line 15 specifies the ideal, no-loss pressure characteristic between the leakage point 11 and the point $1_4$, without a further pressure drop. The line 15a, by contrast, specifies the characteristic with a pressure drop (affected by losses) between the two points 11 and $1_4$. Since the difference between the pressure values is slight, the measured pressure $P_4'$ can be taken as an ideal value for calculating the length $l_3$. In accordance with the diagram in FIG. 2, the slight pressure difference between the ideal value and real value $P_4'$ is not critical for localizing the leakage point 11.

If the leak 11 is sufficiently large, the entire test medium volume, that is to say the volumetric flow, leaves the monitoring channels 3 at the leakage point. At the next measuring point, there is then scarcely any more test medium volume available. The pressure of the test medium drops virtually to zero there in this case. Quiet hissing noises or even tones can also occur in the case of the use of small compressors or pumps when test medium emerges from the small openings. In the event of a leak, the pump increases its output until it reaches its maximum value. It attempts thereby to produce and maintain the set pressure for the test medium. The quiet noises would thus continue unabated.

For the purpose of roughly localizing a damaged site, it is helpful to have, even the route of the pipelines, pressure measuring points which render it possible still to detect at least the section and the location via the pressure gradient upstream of the damage, even in the case of large defects. The precise location of large defects will then be easy to detect in the field, since these are mostly caused by extraneous influences, for example excavators.

Figure 3:
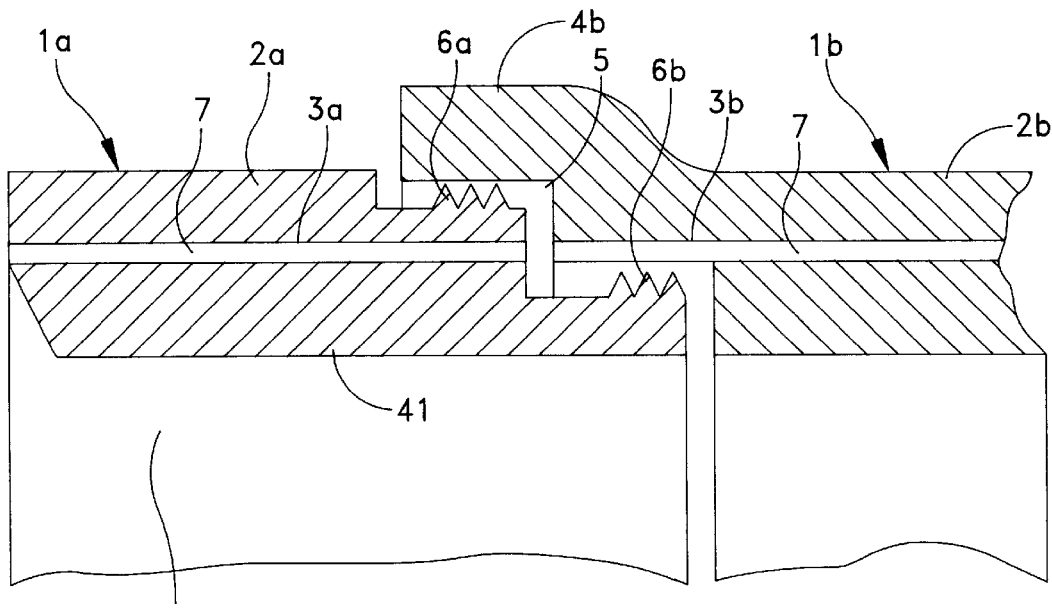
FIG. 3 shows a lateral sectional view of a second embodiment of the device for monitoring the tightness of pipeline systems.

FIG. 3 represents a lateral sectional view of a second embodiment of a device for monitoring the tightness of pipeline systems. In this embodiment, a sleeve 4b is pushed over the correspondingly constructed end of the second pipeline 1a. The seals 6a and 6b arrange din the gap 5 between the sleeve 4b and the end of the outer wall 2a of the pipeline 1a are arranged such that they have a sealing effect outwards with respect to the surroundings and inwards with respect to the pipe interior 15. The test medium 7 provided in the monitoring channels 3a, 3b spreads radially in the gap 5 between the two seals 6a, 6b. The monitoring channels 3a, 3b are open towards the gap. The gap 5 is thereby a part of the pressure chamber of the monitoring channels 3a, 3b.

If the test medium emerges through the seal 6a, the leakage point is localized as described in the previous figures. Localization likewise takes place if the test medium emerges from the outer wall 2a or 2b through a crack or the like occurring there. Since it is mostly pipelines with a length of approximately 50 m which are joined together, the measuring points can be provided in the region of every sleeve 4 or of every second, third, etc. sleeve 4. In the case of pipelines which have a length of approximately 1000 m and are led in one piece through drinking water protection areas, for example, an externalized measuring point can be arranged either at both ends of the pipeline or else therebetween. It is sufficient in this case to provide a suitable means for measuring the pressure. It should be possible to interrogate said means from a central station. The monitoring of the sleeves 4 and of the outer walls 2 of the pipelines 1 is then performed continuously. The individual measuring points along the pipelines can then be interrogated on a display panel in the central control room. The results can be evaluated by means of a computer and an alarm can be set off in the presence of a pressure drop.

A leakage point 11 can be resealed as in the case of tubeless tires. From the pump P, the test medium 7 is fed as appropriate means which remains at the leakage point 11 upon flowing there. It reacts, for example, with the medium emerging from the leak, for example sewage, or, on the outer wall, with dampness from the earth. The pressure of the sewage is lower than that of the test medium in order, in the event of a leak, to prevent sewage passing into the thin monitoring channels 3 and clogging or blocking them. When selecting the test medium 7, it should be ensured that the latter does not react chemically in an explosive or otherwise problematic way with the medium, for example sewage, flowing in the pipeline system 1.

Figure 4:
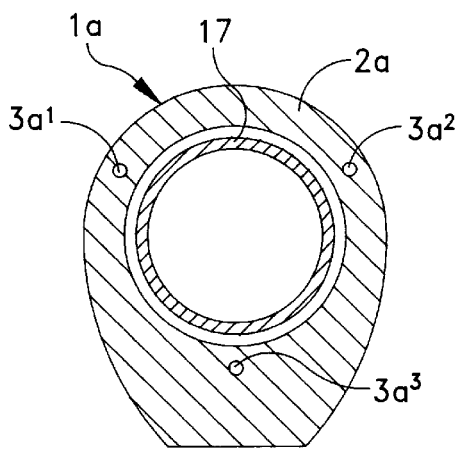
FIG. 4 shows a cross-sectional view of a double-walled pipeline.

FIG. 4 shows a cross-sectional view of a double walled pipeline 1a. The pipeline 1a has the outer wall 2a and an inner wall 17. Insulting material or the like can be provided between the two walls 2a, 17. As a result, the inner pipe is protected against higher loads acting on the outer pipe. However, it is sensible to arrange the monitoring channels 3a in the outer wall 2a, which is under a higher load, for example owing to the earth surrounding said outer pipe and to any temperature fluctuations. In the case of stoneware pipelines, provision is made of monitoring channels made of a thermally loadable, breakable or brittle material which breaks together with the stoneware but is not destroyed while the latter is being produced. Glass is particularly suitable for this. The monitoring channels can, however, also be inserted as flexible hose-like monitoring channels into the damp material while a pipe is being cast. After drying, they can then be removed from the hard pipe by being drawn out. Tubular openings are produced. The latter release the test medium, in the event of cracks appearing in the wall of the pipe, even more quickly than do glass monitoring channels.

The monitoring channels 3 can be arrange din a pipeline 1 of round cross-section, but also in a pipeline 1 of angular cross-section, as in FIG. 4 in the case of pipelines 1a which are flat at the bottom and rest on the ground. Only three monitoring channels $3a_1$, $3a_2$, $3a_3$ or tubular openings are provided. However, it is also optionally possible to provide more than three monitoring channels or tubular openings. The number required can be determined empirically or prescribed. In any case, it is to be ensured that, in the event of a leak in a wall of the pipeline, at least one monitoring channel provided there or a tubular opening breaks at the same time and releases the test medium, so that the leak can be localized. If too few monitoring channels 3a are provided, a leak can occur without the pressure in the monitoring channels decreasing or the test medium volume being reduced.

Figure 5:
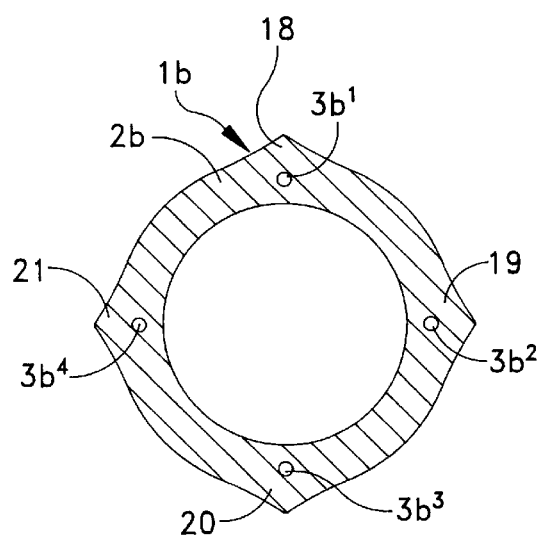
FIG. 5 shows a cross-sectional view of a second embodiment of a pipeline.

FIG. 5 shows a cross-sectional view of a further embodiment of a pipeline 1b. It has an essentially round cross-section with four corners 18, 19, 20, 21. Monitoring channels $3b_1$, $3b_2$, $3b_3$, $3b_4$ are arranged in these corners 18, 19, 20, 21. In order to prevent the monitoring channels 3 or tubular openings from weakening the outer wall 2b of the pipelines 1b, in this embodiment reinforcements of the material are provided along the longitudinal extent of the pipelines 1b in the region of the monitoring channels or tubular openings. This then produces the pipeline 1b, which is essentially round when viewed from outside, with corners 18, 19, 20, 21. Weakening of the outer wall 2b of the pipeline 1b can be caused by an undesired leakage point 11.

Figure 6:
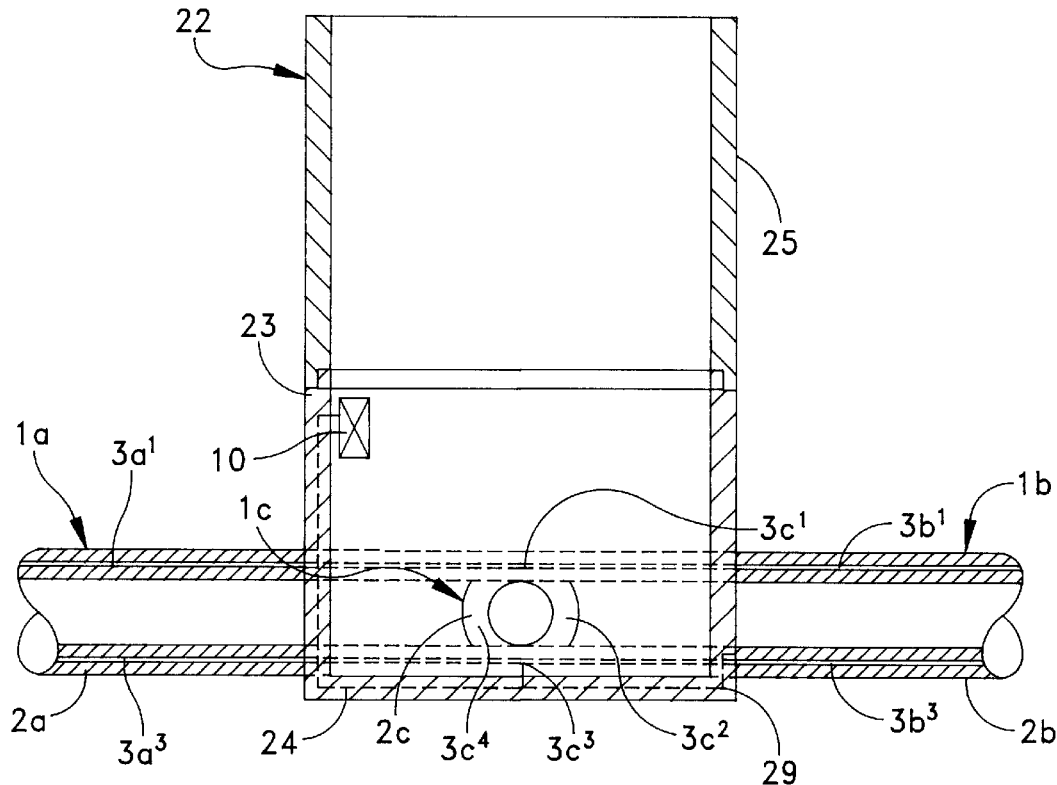
FIG. 6 shows a lateral sectional view of a shaft with pipelines exiting in the three different directions.

FIG. 6 shows a lateral sectional view of a shaft 22, from which pipelines 1a, 1b, 1c exit in three different directions. Four monitoring channels 3a, 3b, 3c each are provided in all three pipelines. Said channels are joined to one another, as are the pipelines 1a, 1b, 1c. As a result, the test medium volume fed from the pump P or a compressor is present in all the monitoring channels 3a, 3b, 3c. The pressure sensor 10 arranged on a wall 23 of the shaft 22 under a removable cover 25 is connected to the monitoring channels 3a, 3b, 3c by hoses or thin tubes 24. The pressure sensor 10 can be connected by cable or by radio transmission to a central control room or computer. If the three pipelines 1a, 1b or 1c are not joined to one another, then the monitoring channels 3a, 3b, 3c are not joined either. The hoses or thin tubes 24 joined to the monitoring channels 3a, 3b, 3c can then lead to three different pressure sensors 10 (not represented). In this case, provision is made of three pumps P for providing the test medium volume and the static pressure thereof. The shafts frequently to be encountered in the case of sewage are, in principle, only specially shaped walls for the medium which is to be transported. By integrating hoses or thin tubes 24 in walls 23 and the floor 29 of the shaft, the latter is also incorporated into the monitoring.

Figure 7:
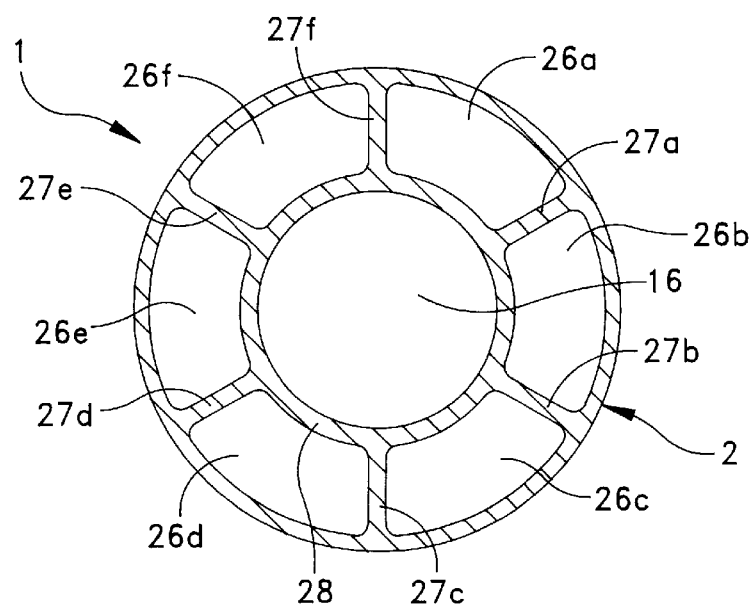
FIG. 7 shows a cross-sectional view of a third embodiment of a pipeline.

A cross-sectional view of a further embodiment of a pipeline is represented in FIG. 7. Monitoring chambers 26 are provided instead of the thin monitoring channels 3. For reasons of clarity, the chambers 26 are represented with exaggerated dimensions. In reality, they are of smaller size. In the sectional view, six such monitoring chambers 26a to 26f in the shape of circular segments are provided. The view looks like a wagon wheel with an outer and an inner ring with spokes arranged therebetween. The spokes are walls 27a to 27f between the individual chambers 26. The outer ring is the outer wall 2 of the pipeline 1. The inner ring is the actual pipeline, which in this case is an inner wall 28 bounding the pipe interior 16. The monitoring chambers 26 operate in the same way as the monitoring channels 3 or tubular openings. The only difference is that the cross-section through which flow occurs is larger than in the latter case. In the event of a leak in the outer wall 2 of the pipeline 1, the test medium 7 flows outwards, just as in the case of the monitoring chambers 3 or tubular openings, and indicates the leak by the pressure drop produced.

The monitoring chambers 26 can be manufactured, for example, by pushing into and/or through the as yet damp pipe appropriately shaped moulded parts, which produce the chambers 26 in the previously thick outer wall 2.

The monitoring channels 3 or monitoring chambers 26 can already be used when assembling the pipelines, specifically directly following the joining of two pipes by a sleeve. The sleeve sealing is then to be monitored in order to be able to ensure a tight pipeline from the outset.

I claim:

1. A method for monitoring the tightness of a pipeline system having at least two pipeline sections that are tightly joined to one another at mutually facing ends, said method comprising the steps of:

(a) forming at least one monitoring channel in a wall of each pipeline section along a longitudinal axis thereof, said monitoring channel extending the entire length of each pipeline section and having an opening in each facing end of said pipeline section, said openings in said mutually facing ends of said pipeline sections being oriented in abutting relation such that the monitoring channel of each pipeline section is in fluid communication with the monitoring channel of its adjacent pipeline section;

(b) providing a source of pressurized test medium;

(c) filling the monitoring channel with a test medium under static pressure; and (d) measuring pressure in the monitoring channel wherein leaks in the pipeline system are determined by a drop in pressure of the test medium between two measuring points.

2. The method according to claim 1 further comprising the steps of:

compressing the test medium to a desired static pressure; and reducing the pressure of the test medium to a starting value downstream of a means for compressing the test medium, said test medium being in the form of a fluid.

3. The method according to claim 1, said monitoring channel being arranged in an outer wall of each pipeline section so that the monitoring channel and the pipeline section break together when the pipeline section is broken.

4. The method according to claim 1, said pressure being the same at all points of the pipeline system when in a state of rest.

5. The method according to claim 1 further comprising a shaft in fluid communication with the pipeline, said shaft having at least one hose formed in a wall thereof which defines a monitoring channel for monitoring the shaft.

6. A device for monitoring the tightness of a pipeline system having at least two pipeline sections that are tightly joined to one another at mutually facing ends and a sleeve for achieving the joining of the pipeline sections, said device comprising:

at least one monitoring channel in a wall of each pipeline section along a longitudinal axis thereof, said monitoring channel extending the entire length of each pipeline section and having an opening in each facing end of said pipeline section, said openings in said mutually facing ends of said pipeline sections being oriented in abutting relation such that the monitoring channel of each pipeline section is in fluid communication with the monitoring channel of its adjacent pipeline section;

means for delivering a pressurized test medium to the monitoring channel; and means for measuring pressure of the test medium within the monitoring channel.

7. The device according to claim 6, each pipe section having three or more monitoring channels formed therein.

8. The device according to claim 6, said monitoring channels having a diameter of less than 10 mm.

9. The device according to claim 6, said monitoring channels having a diameter of 3 mm.

10. The device according to claim 6, said monitoring channels defining monitoring chambers.

* * * * *